UNITED STATES PATENT OFFICE.

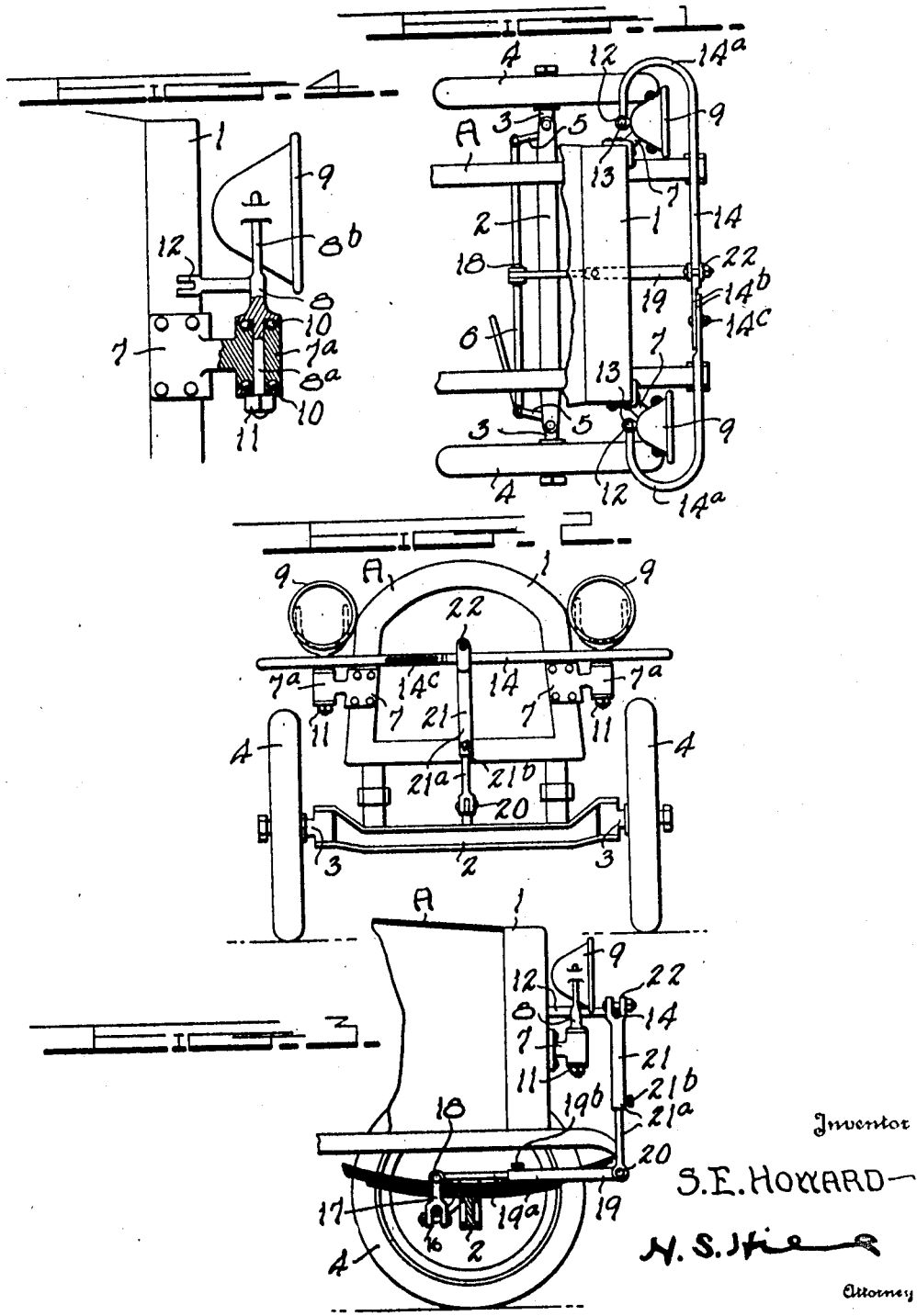

SAMUEL EUGENE HOWARD, OF KEENE, NEW HAMPSHIRE, ASSIGNOR TO HANNAH G. HOWARD, OF KEENE, NEW HAMPSHIRE.

DIRIGIBLE AUTOMOBILE-HEADLIGHT.

1,187,459.   Specification of Letters Patent.   Patented June 13, 1916.

Application filed October 13, 1915.   Serial No. 55,695.

*To all whom it may concern:*

Be it known that I, SAMUEL EUGENE HOWARD, a citizen of the United States, residing at Keene, in the county of Cheshire, State of New Hampshire, have invented a new and useful Dirigible Automobile - Headlight; and I do hereby declare the following to be a full, clear, and exact description of the invention, such as will enable others skilled in the art to which it appertains to make and use the same.

The present invention relates to certain new and useful improvements in dirigible headlights for automobiles, and has for its object to provide a device of this character which embodies novel features of construction whereby the headlights are mounted in such a manner as to turn with the front wheels when the automobile is steered either to the right or to the left, thereby enabling the driver to see where he is running when turning a sharp corner after dark.

Further objects of the invention are to provide a dirigible headlight which is comparatively simple and inexpensive in its construction, which can be readily mounted upon any conventional form of automobile without necessitating any alterations or changes in the construction thereof, which is strong and durable in its construction and not liable to get out of repair, and which will not interfere with the steering of the machine.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a top plan view of a fragmentary portion of the front of an automobile, showing the manner of applying a dirigible headlight constructed in accordance with the invention thereto. Fig. 2 is a front elevation of the same. Fig. 3 is a longitudinal sectional view through the front portion of an automobile, showing the manner of connecting the headlight to the steering arm connecting rod. Fig. 4 is an enlarged side elevation of one of the headlights, portions of the supporting bracket being broken away to illustrate more clearly the details of construction.

Corresponding and like parts are referred to in the following description and indicated in all the views of the drawing by the same reference characters.

Specifically describing the present embodiment of the invention, the reference character A designates in a diagrammatic manner the front of an automobile which is of the conventional construction. The radiator is designated at 1, the front axle at 2, the spindles at 3, the front wheels at 4, the spindle arms at 5, and the spindle arm connecting rod at 6. All of the parts mentioned above are of the well-known and conventional construction.

Rigidly secured to each side of the radiator 1 and projecting therefrom is a bracket 7, said brackets terminating in the vertical bearing sleeve 7ª which receive the spindles 8ª at the lower ends of the lamp standards 8. The upper ends of the lamp standards terminate in the usual forks 8ᵇ upon which the lamps 9 are mounted. Suitable anti-friction bearings 10 are provided at the upper and lower ends of the bearing sleeves 7ª, and the lower extremities of the spindles 8ª are threaded to receive the nuts 11 which serve to retain the spindles in position. Projecting rearwardly from the base of each of the lamp standards 8 is a lateral arm 12, said arms being pivotally connected at 13 to the inwardly returned extremities 14ª of a horizontally disposed cross bar 14 which extends across the front of the radiator 1. The returned extremities 14ª of the cross bar provide the necessary clearance space for the proper operation of the device, and also enable the cross bar to extend across the front of the radiator in the most convenient position.

A clamp 16 is rigidly applied to the spindle arm connecting rod 6 at an intermediate point in the length thereof, and an arm 17 projects upwardly therefrom, the extremity of the said arm being hingedly connected at 18 to the rear end of a forwardly extending link 19 which has the forward end thereof hinged at 20 to an upright bar 21 secured at its upper end to the cross bar 14, as indicated at 22. The two hinged joints 18 and 20 are constructed in such a manner that the link 19 can swing up and down vertically about the horizontal axis, although it can not swing laterally about a vertical axis. The upright bar 21 is thus free to move up and down independently of the arm 17 as the car body vibrates upon the supporting springs, although the upright bar will move laterally with the arm 17 and spindle arm connecting rod 6 when the front wheels are turned in either direction, thereby causing the head lamps 9 to swing in the direction in which the vehicle is being turned. The link 19 is preferably made extensible, being shown as formed in two overlapping sections 19$^a$ which are rigidly held in an adjusted position by the bolts 19$^b$. In a similar manner the upright bar 21 is preferably made extensible, being shown as formed in two overlapping sections 21$^a$ which are rigidly connected and held in an adjusted position by the bolts 21$^b$. The same is also true of the cross bar 14, which may be formed in overlapping sections 14$^b$ adapted to be secured together in an adjusted position by the bolts 14$^c$. This enables the various parts to be readily adjusted so that the device can be fitted upon any make or design of automobile without necessitating a special construction and special sizes for each particular make of automobile.

When the device is properly mounted upon the automobile and connected to the steering gear, the headlights will automatically turn in the direction in which the front wheels turn, so that the driver can see clearly where he is running when making a sharp turn after dark. Accidents may thus be avoided, since with the ordinary headlights the driver frequently runs into an obstacle when making a sharp turn, owing to the fact that as the lights do not turn with the wheels he is unable to see that portion of the road into which he is turning.

Having thus described the invention, what I claim as new and desire to secure by Letters Patent, is:—

A dirigible headlight for automobiles, including lamp brackets applied to opposite sides of the radiator and provided with vertical bearing sleeves, lamp standards provided with spindles which are rotatably mounted within the vertical bearing sleeves, lateral arms projecting rearwardly from the standards, a cross bar extending transversely across the front of the radiator and having the extremities thereof returned rearwardly and pivotally connected to the lateral arms of the lamp standards, the returned ends of the cross bar providing a clearance space for the lamp brackets when the cross bar is moved back and forth, an upright bar rigidly connected to the cross bar, and a link member operatively connecting the lower end of the upright bar to the spindle arm connecting rod of the steering gear.

In testimony whereof I have signed my name to this specification in the presence of two subscribing witnesses.

SAMUEL EUGENE HOWARD.

Witnesses:
GEORGE OREN WISWALL,
LEAH F. KINDER.

Copies of this patent may be obtained for five cents each, by addressing the "Commissioner of Patents, Washington, D. C."